United States Patent
Hammad et al.

(10) Patent No.: US 8,375,441 B2
(45) Date of Patent: Feb. 12, 2013

(54) PORTABLE CONSUMER DEVICE CONFIGURED TO GENERATE DYNAMIC AUTHENTICATION DATA

(75) Inventors: Ayman Hammad, Pleasanton, CA (US); Patrick Faith, Pleasanton, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 16 days.

(21) Appl. No.: 12/874,008

(22) Filed: Sep. 1, 2010

(65) Prior Publication Data

US 2011/0066516 A1    Mar. 17, 2011

Related U.S. Application Data

(63) Continuation of application No. 11/764,622, filed on Jun. 18, 2007, now Pat. No. 7,810,165.

(60) Provisional application No. 60/884,089, filed on Jan. 9, 2007, provisional application No. 60/815,430, filed on Jun. 20, 2006, provisional application No. 60/815,059, filed on Jun. 19, 2006.

(51) Int. Cl.
  *G06Q 20/00*  (2006.01)
  *G06K 19/073*  (2006.01)
  *G06F 1/26*  (2006.01)

(52) U.S. Cl. ............. 726/21; 726/20; 726/36; 713/168; 713/194; 705/44; 705/50; 705/64; 705/67; 705/75; 235/462.45; 235/492

(58) Field of Classification Search ............... 726/2, 27, 726/36, 20, 21; 713/168, 189, 194; 705/44, 705/50, 64, 75, 67; 235/462.45, 492
  See application file for complete search history.

(56) References Cited

U.S. PATENT DOCUMENTS 4,277,837 A    7/1981 Stuckert
4,528,442 A    7/1985 Endo
5,017,766 A    5/1991 Tamada et al.
  (Continued)

FOREIGN PATENT DOCUMENTS

CN    1435985 A    8/2003
EP    0926624 A2    6/1999
  (Continued)

OTHER PUBLICATIONS

Office Action dated Jul. 20, 2011 from Australian Patent Application No. 2007261035, 2 pages.
  (Continued)

*Primary Examiner* — Philip Chea
*Assistant Examiner* — Shanto M Abedin
(74) *Attorney, Agent, or Firm* — Kilpatrick Townsend & Stockton LLP

(57) ABSTRACT

Embodiments of the invention provide a portable consumer device configured to store dynamic authentication data in memory. The portable consumer device also includes an interface for transmitting data to and receiving power from an external device. The dynamic authentication data is read from the memory by a read-write device located on the portable consumer device. The authentication data is updated and the updated data may be written into memory using the read-write device. In some embodiments, an authentication value read from the memory may be used to generate another authentication value based on an algorithm. The portable consumer device is further configured to transmit authentication data to an external device. The process of reading, updating, generating, transmitting, and rewriting the authentication data may occur each time external power is provided to the portable consumer device via the interface. The power for operating the components of the portable consumer device may be drawn exclusively from the power received from the external device (i.e., the external power). In some embodiments, a portion of the external power may be temporarily stored on an energy storage means of the portable consumer device.

12 Claims, 7 Drawing Sheets

U.S. PATENT DOCUMENTS

| | | | |
|---|---|---|---|
| 5,254,843 | A | 10/1993 | Hynes et al. |
| 5,311,594 | A | 5/1994 | Penzias |
| 5,434,398 | A | 7/1995 | Goldberg |
| 5,465,387 | A | 11/1995 | Mukherjee |
| 5,513,250 | A | 4/1996 | McAllister |
| 5,625,689 | A | 4/1997 | Indeck et al. |
| 5,627,355 | A | 5/1997 | Rahman et al. |
| 5,708,422 | A | 1/1998 | Blonder et al. |
| 5,721,781 | A | 2/1998 | Deo et al. |
| 5,740,244 | A | 4/1998 | Indeck et al. |
| 5,774,525 | A | 6/1998 | Kanevsky et al. |
| 5,819,226 | A | 10/1998 | Gopinathan et al. |
| 5,834,747 | A | 11/1998 | Cooper |
| 5,872,834 | A | 2/1999 | Teitelbaum |
| 5,878,337 | A | 3/1999 | Joao et al. |
| 5,903,830 | A | 5/1999 | Joao et al. |
| 5,914,472 | A | 6/1999 | Foladare et al. |
| 5,920,628 | A | 7/1999 | Indeck et al. |
| 5,988,497 | A | 11/1999 | Wallace |
| 6,012,144 | A | 1/2000 | Pickett |
| 6,016,476 | A | 1/2000 | Maes et al. |
| 6,029,154 | A | 2/2000 | Pettitt |
| 6,157,707 | A | 12/2000 | Baulier et al. |
| 6,184,651 | B1 | 2/2001 | Fernandez et al. |
| 6,219,793 | B1 | 4/2001 | Li et al. |
| 6,260,146 | B1 | 7/2001 | Mos et al. |
| 6,308,890 | B1 | 10/2001 | Cooper |
| 6,442,532 | B1 | 8/2002 | Kawan |
| 6,466,126 | B2 | 10/2002 | Collins et al. |
| 6,523,745 | B1 | 2/2003 | Tamori |
| 6,529,725 | B1 | 3/2003 | Joao et al. |
| 6,607,136 | B1 | 8/2003 | Atsmon et al. |
| 6,612,488 | B2 | 9/2003 | Suzuki |
| 6,616,035 | B2 | 9/2003 | Ehrensvard et al. |
| 6,714,918 | B2 | 3/2004 | Hillmer et al. |
| 6,823,721 | B1 | 11/2004 | Hilpert et al. |
| 6,832,721 | B2 | 12/2004 | Fujii |
| 6,839,840 | B1 | 1/2005 | Cooreman |
| 6,850,916 | B1 | 2/2005 | Wang |
| 6,883,717 | B1 | 4/2005 | Kelley |
| 6,899,269 | B1 | 5/2005 | Deland |
| 6,913,194 | B2 | 7/2005 | Suzuki |
| 6,983,882 | B2 | 1/2006 | Cassone |
| 7,003,495 | B1 | 2/2006 | Burger et al. |
| 7,003,497 | B2 | 2/2006 | Maes |
| 7,013,293 | B1* | 3/2006 | Kipnis et al. ............... 705/43 |
| 7,024,396 | B2 | 4/2006 | Woodward |
| 7,044,394 | B2 | 5/2006 | Brown |
| 7,051,002 | B2 | 5/2006 | Keresman, III et al. |
| 7,058,978 | B2 | 6/2006 | Feuerstein et al. |
| 7,096,003 | B2 | 8/2006 | Joao et al. |
| 7,143,095 | B2 | 11/2006 | Barrett et al. |
| 7,248,017 | B2 | 7/2007 | Cheng et al. |
| 7,328,850 | B2 | 2/2008 | Sines |
| 7,377,433 | B2 | 5/2008 | Morley, Jr. et al. |
| 7,403,908 | B1 | 7/2008 | Jaramillo |
| 7,420,474 | B1 | 9/2008 | Elks et al. |
| 7,482,925 | B2 | 1/2009 | Hammad et al. |
| 7,493,487 | B2 | 2/2009 | Phillips et al. |
| 7,540,015 | B2 | 5/2009 | Friedman |
| 7,571,124 | B2 | 8/2009 | Bodin |
| 7,810,165 | B2 | 10/2010 | Hammad et al. |
| 7,938,726 | B2 | 5/2011 | Brunet De Courssou |
| 2002/0088863 | A1 | 7/2002 | Ou |
| 2002/0091562 | A1 | 7/2002 | Siegel et al. |
| 2002/0095389 | A1 | 7/2002 | Gaines |
| 2002/0099665 | A1 | 7/2002 | Burger et al. |
| 2002/0108062 | A1 | 8/2002 | Nakajima et al. |
| 2002/0116626 | A1 | 8/2002 | Wood |
| 2002/0133462 | A1 | 9/2002 | Shteyn |
| 2002/0153424 | A1 | 10/2002 | Li |
| 2002/0194499 | A1 | 12/2002 | Audebert et al. |
| 2003/0061110 | A1* | 3/2003 | Bodin ............... 705/26 |
| 2003/0074317 | A1 | 4/2003 | Hofi |
| 2003/0085286 | A1* | 5/2003 | Kelley et al. ............... 235/492 |
| 2003/0115142 | A1 | 6/2003 | Brickell et al. |
| 2003/0200184 | A1 | 10/2003 | Dominguez et al. |
| 2003/0208684 | A1 | 11/2003 | Camacho et al. |
| 2003/0212894 | A1* | 11/2003 | Buck et al. ............... 713/184 |
| 2003/0225703 | A1 | 12/2003 | Angel |
| 2004/0031856 | A1 | 2/2004 | Atsmon et al. |
| 2004/0059688 | A1 | 3/2004 | Dominguez et al. |
| 2004/0078340 | A1 | 4/2004 | Evans |
| 2004/0107170 | A1 | 6/2004 | Labrou et al. |
| 2004/0171373 | A1 | 9/2004 | Suda et al. |
| 2004/0171406 | A1 | 9/2004 | Purk |
| 2004/0185830 | A1 | 9/2004 | Joao et al. |
| 2005/0029349 | A1* | 2/2005 | McGregor et al. ............ 235/439 |
| 2005/0060233 | A1 | 3/2005 | Bonalle et al. |
| 2005/0080730 | A1 | 4/2005 | Sorrentino |
| 2005/0097320 | A1 | 5/2005 | Golan et al. |
| 2005/0122209 | A1 | 6/2005 | Black |
| 2005/0170814 | A1 | 8/2005 | Joao et al. |
| 2005/0171905 | A1 | 8/2005 | Wankmueller et al. |
| 2005/0218229 | A1 | 10/2005 | Morley, Jr. et al. |
| 2005/0228986 | A1 | 10/2005 | Fukasawa et al. |
| 2005/0234822 | A1 | 10/2005 | VanFleet et al. |
| 2005/0268107 | A1 | 12/2005 | Harris et al. |
| 2005/0273442 | A1 | 12/2005 | Bennett et al. |
| 2006/0059110 | A1 | 3/2006 | Madhok et al. |
| 2006/0074598 | A1 | 4/2006 | Bishop et al. |
| 2006/0112275 | A1 | 5/2006 | Jeal et al. |
| 2006/0202025 | A1 | 9/2006 | Calabrese et al. |
| 2006/0255128 | A1 | 11/2006 | Johnson et al. |
| 2006/0281439 | A1 | 12/2006 | Benco et al. |
| 2006/0282382 | A1 | 12/2006 | Balasubramanian et al. |
| 2007/0103274 | A1 | 5/2007 | Berthold |
| 2007/0192601 | A1 | 8/2007 | Spain et al. |
| 2007/0220272 | A1* | 9/2007 | Campisi et al. ............... 713/186 |
| 2007/0260544 | A1 | 11/2007 | Wankmueller et al. |
| 2007/0271596 | A1* | 11/2007 | Boubion et al. ............... 726/3 |
| 2008/0029593 | A1 | 2/2008 | Hammad et al. |
| 2008/0040276 | A1 | 2/2008 | Hammad et al. |
| 2008/0179401 | A1 | 7/2008 | Hart et al. |
| 2010/0024029 | A1* | 1/2010 | Sasaki et al. ............... 726/17 |

FOREIGN PATENT DOCUMENTS

| | | |
|---|---|---|
| EP | 1139200 A2 | 10/2001 |
| FR | 2796742 A1 | 1/2001 |
| GB | 2398152 A | 8/2004 |
| JP | 2000-151578 A | 5/2000 |
| JP | 2001-509908 A | 7/2001 |
| JP | 2001-524771 A | 12/2001 |
| JP | 2002-92739 A | 3/2002 |
| JP | 2002-109436 A | 4/2002 |
| JP | 2003-196566 A | 7/2003 |
| JP | 2004-126898 A | 4/2004 |
| WO | WO 95/06371 A1 | 3/1995 |
| WO | 98/31123 A1 | 7/1998 |
| WO | 2005/020012 A2 | 3/2005 |
| WO | 2005/025292 A2 | 3/2005 |
| WO | 2006/023839 A2 | 3/2006 |

OTHER PUBLICATIONS

The extended European Search Report for Application No. EP07812194.4, dated Feb. 17, 2011, 6 pages.
U.S. Appl. No. 11/761,821, Faith.
U.S. Appl. No. 11/763,240, Faith.
U.S. Appl. No. 11/764,343, Faith.
U.S. Appl. No. 11/764,351, Faith.
U.S. Appl. No. 11/764,361, Faith.
U.S. Appl. No. 11/764,376, Faith.
U.S. Appl. No. 11/764,370, Faith.
Office Action dated Jun. 6, 2008 from U.S. Appl. No. 11/764,622, 14 pages.
Office Action dated Dec. 31, 2008 from U.S. Appl. No. 11/764,622, 17 pages.
Office Action dated Jul. 9, 2009 from U.S. Appl. No. 11/764,622, 16 pages.
Office Action dated Mar. 15, 2010 from U.S. Appl. No. 11/764,622, 21 pages.
Notice of Allowance dated Jun. 1, 2010 from U.S. Appl. No. 11/764,622, 12 pages.
Supplemental Notice of Allowability dated Jul. 27, 2010, from U.S. Appl. No. 11/764,622, 10 pages.

Australian Office Action mailed on Sep. 10, 2012 for AU Patent Application No. 2007261035, 3 pages.
Japanese Office Action mailed on Jul. 31, 2012 for JP Patent Application No. 2009-51660, with English Translation, 10 pages.
International Search Report mailed on Jul. 15, 2008, for PCT Patent Application No. PCT/US07/71518, 1 page.
Written Opinion of the International Searching Authority mailed on Jul. 15, 2008, for PCT Patent Application No. PCT/US07/71518, 7 pages.
Australian Office Action mailed on Feb. 28, 2012, for AU Patent Application No. 2007261035, 2 pages.
Communication from the European Patent Office mailed on Dec. 27, 2011, for EP Patent Application No. 07812194.4, 5 pages.
International Search Report mailed on Dec. 6, 2007, for PCT Patent Application No. PCT/US07/71200, 1 page.
International Search Report mailed on Mar. 28, 2008, for PCT Patent Application No. PCT/US07/71480, 1 page.
Written Opinion of the International Searching Authority mailed on Mar. 28, 2008, for PCT Patent Application No. PCT/US07/71480, 4 pages.
Australian Office Action mailed on Jun. 24, 2010, for AU Patent Application No. 2007290325, 4 pages.
Australian Notice of Acceptance mailed on Mar. 17, 2011, for AU Patent Application No. 2007290325, 3 pages.
Chinese Office Action mailed on Mar. 23, 2011, for Chinese Patent Application No. 200780027259.3, with English Translation, 11 pages.
Chinese Office Action mailed on Mar. 21, 2012, for Chinese Patent Application No. 200780027259.3, with English Translation, 15 pages.
Extended European Search Report mailed on May 26, 2011, for EP Patent Application No. 07853494.8, 8 pages.
Russian Office Action mailed on Nov. 10, 2011, for RU Patent Application No. 2009101311/08, with English translation, 16 pages.
Russian Office Action mailed on Mar. 14, 2012, for RU Patent Application No. 2009101311/08, with English translation, 16 pages.

* cited by examiner

PORTABLE CONSUMER DEVICE CONFIGURED TO GENERATE DYNAMIC AUTHENTICATION DATA

CROSS REFERENCE TO RELATED APPLICATIONS

This application is a continuation of U.S. patent application Ser. No. 11/764,622, filed Jun. 18, 2007, now U.S. Pat. No. 7,810,165, issued Oct. 5, 2010, which claims the benefit of U.S. Provisional Patent Application No. 60/815,059, filed Jun. 19, 2006, U.S. Provisional Patent Application No. 60/815,430, filed Jun. 20, 2006, and U.S. Provisional Patent Application No. 60/884,089, filed Jan. 9, 2007. The entire contents of these applications are herein incorporated by reference for all purposes.

BACKGROUND

Embodiments of the present invention relate to systems and methods for providing an improved portable consumer device capable of generating dynamic data for authentication purposes.

As methods and devices for engaging in financial transactions have increased in number, problems such as fraud and counterfeiting have also increased in severity. In particular, applications and devices developed to make credit or debit based financial transactions more readily available have also made fraud and counterfeiting easier. In order to protect financial institutions, consumers, and merchants from fraudulent transactions, the industry has developed and introduced many features designed to reduce fraud and counterfeiting in portable consumer devices, such as holograms, special over-layers, and watermarks. Nonetheless, many of these features are proving to be less effective as financial transactions are increasingly conducted in a wireless environment. For example, the introduction of contactless portable consumer devices that utilize RF technology to conduct payment transactions has enabled surreptitious and remote skimming of the information stored on the device for subsequent fraudulent use.

Data skimming is one of the primary sources of fraud in the financial industry and refers to the electronic copying of the data stored on a portable consumer device (e.g., a payment card's magnetic stripe data or data stored in the memory of a contactless device) to create counterfeit devices and/or conduct counterfeit transactions. Skimming is successful because the data stored on the portable consumer device is static and therefore can be perfectly copied.

In order to combat data skimming, systems and methods have been introduced to dynamically generate an authentication value for each financial transaction conducted by the portable consumer device. This authentication value changes for each transaction and therefore significantly reduces the effectiveness of data skimming. Even if the data utilized in a given transaction is skimmed, that data will not be useful in conducting further transactions since the skimmed authentication value is not valid for subsequent transactions.

One example of a portable consumer device capable of providing variable authentication data includes a rewriteable magnetic-stripe card described in Brown U.S. Pat. No. 7,044,394. Brown refers to a re-writing device such as a magnetic write head that may be used to rewrite the data on the magnetic stripe of the card. Brown also refers to a battery within the card for supplying power to the re-writing device. The use of batteries in portable consumer devices is, however, not particularly desirable for many reasons. For example, batteries add cost and limit the lifespan of the device and need to be disposed of in an environmentally friendly manner. Also, if a battery-powered device does not have sufficient power at a given moment, a particular transaction conducted with a portable consumer device may not take place as intended.

In view of the foregoing, the present invention relates to improved systems and methods for providing a portable consumer device capable of handling dynamic authentication data. Embodiments of the invention address these and other embodiments individually and collectively.

BRIEF SUMMARY

Embodiments of the invention provide a portable consumer device configured to store dynamic authentication data in memory. The portable consumer device also includes an interface for transmitting data to and receiving power from an external device. The dynamic authentication data is read from the memory by a read-write device located on the portable consumer device. The authentication data is updated and the updated data may be written into memory using the read-write device. In some embodiments, an authentication value read from the memory may be used to generate another authentication value based on an algorithm. The portable consumer device is further configured to transmit authentication data to an external device. The process of reading, updating, generating, transmitting, and rewriting the authentication data may occur each time external power is provided to the portable consumer device via the interface. The power for operating the components of the portable consumer device may be drawn exclusively from the power received from the external device (i.e., the external power). In some embodiments, a portion of the external power may be temporarily stored on an energy storage means of the portable consumer device.

Another embodiment of the invention is directed to a method for authenticating a transaction that includes the steps of providing external power to a portable consumer device, reading a counter value stored on the portable consumer device and updating the counter value each time external power is provided to the portable consumer device, where power for the reading and updating steps is sourced exclusively from the external power.

These and other embodiments of the invention are described in further detail below.

DETAILED DESCRIPTION

Embodiments of the invention are directed to improved transaction authentication systems and methods. In particular, embodiments of the invention provide improved systems and methods for authenticating a portable consumer device used to conduct a financial transaction.

Figure 1:
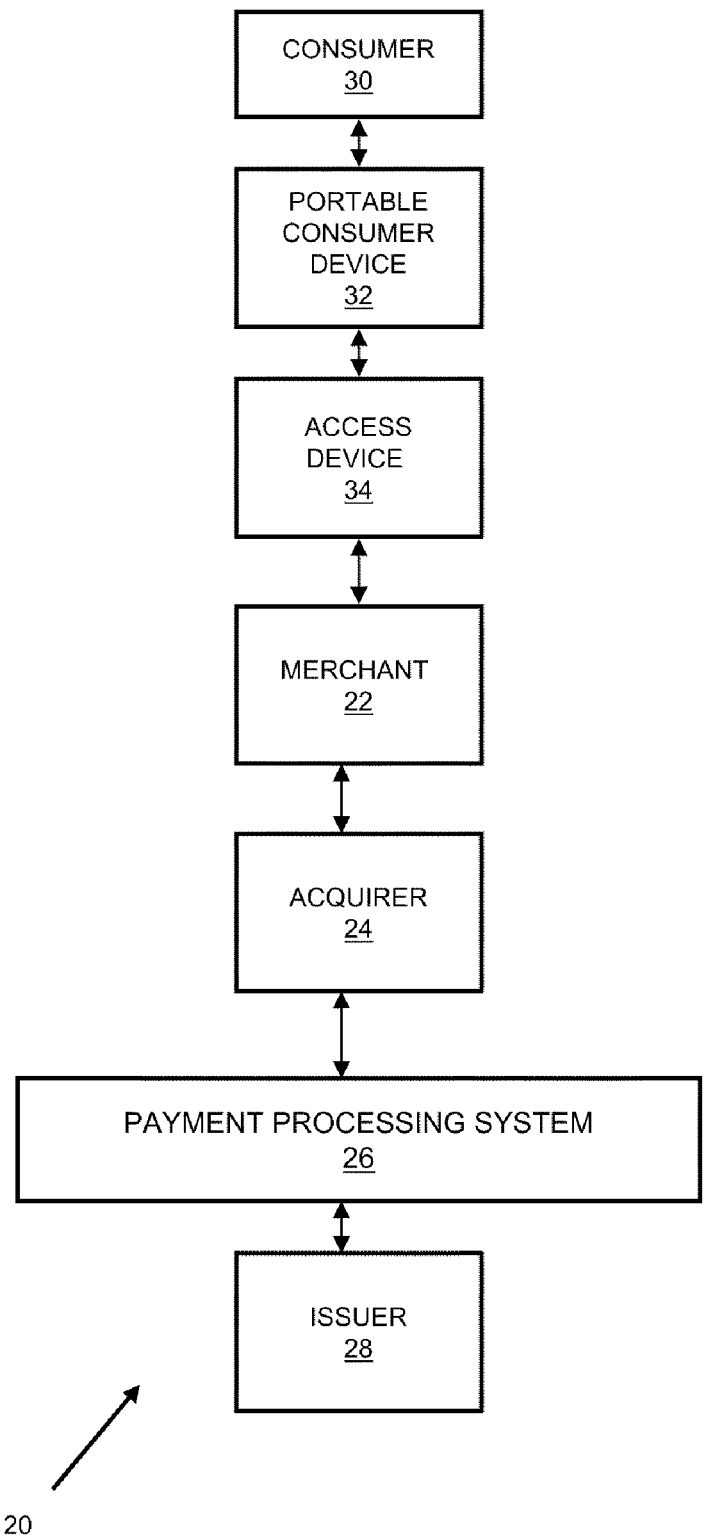
FIG. 1 shows a schematic diagram of a payment processing network.

In a typical purchase transaction, a consumer uses a portable consumer device (e.g., a credit card) to purchase goods or services from a merchant. FIG. 1 shows a system 20 that can be used in an embodiment of the invention. The system 20 includes a merchant 22 and an acquirer 24 associated with the merchant 22. In a typical payment transaction, a consumer 30 may purchase goods or services at the merchant 22 using a portable consumer device 32. The acquirer 24 can communicate with an issuer 28 via a payment processing system 26. The consumer 30 may be an individual, or an organization such as a business that is capable of purchasing goods or services.

The portable consumer device 32 may be in any suitable form. For example, suitable portable consumer devices can be hand-held and compact so that they can fit into a consumer's wallet and/or pocket (e.g., pocket-sized). They may include smart cards, credit or debit cards (with a magnetic stripe), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

The payment processing system 26 may include data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing system 26 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing system 26 may use any suitable wired or wireless network, including the Internet.

The merchant 22 may also have, or may receive communications from, an access device 34 that can interact with the portable consumer device 32. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 32.

In a typical purchase transaction, the consumer 30 purchases a good or service at the merchant 22 using a portable consumer device 32 such as a credit card. The consumer's portable consumer device 32 can interact with an access device 34 such as a POS (point of sale) terminal at the merchant 22. For example, the consumer 30 may take a credit card and may swipe it through an appropriate slot in the POS terminal. Alternatively, the POS terminal may be a contactless reader, and the portable consumer device 32 may be a contactless device such as a contactless card.

An authorization request message is then forwarded to the acquirer 24. After receiving the authorization request message, the authorization request message is then sent to the payment processing system 26. The payment processing system 26 then forwards the authorization request message to the issuer 28 of the portable consumer device 32.

After the issuer 28 receives the authorization request message, the issuer 28 sends an authorization response message back to the payment processing system 26 (step 56) to indicate whether or not the current transaction is authorized (or not authorized). The transaction processing system 26 then forwards the authorization response message back to the acquirer 24. The acquirer 24 then sends the response message back to the merchant 22.

After the merchant 22 receives the authorization response message, the access device 34 at the merchant 22 may then provide the authorization response message for the consumer 30. The response message may be displayed by the POS terminal, or may be printed out on a receipt.

At the end of the day, a normal clearing and settlement process can be conducted by the transaction processing system 26. A clearing process is a process of exchanging financial details between and acquirer and an issuer to facilitate posting to a consumer's account and reconciliation of the consumer's settlement position. Clearing and settlement can occur simultaneously.

Embodiments of the invention are not limited to the above-described embodiments. For example, although separate functional blocks are shown for an issuer, payment processing system, and acquirer, some entities perform (e.g., Discover, AMEX, etc.) all of these functions and may be included in embodiments of invention.

Figure 2:
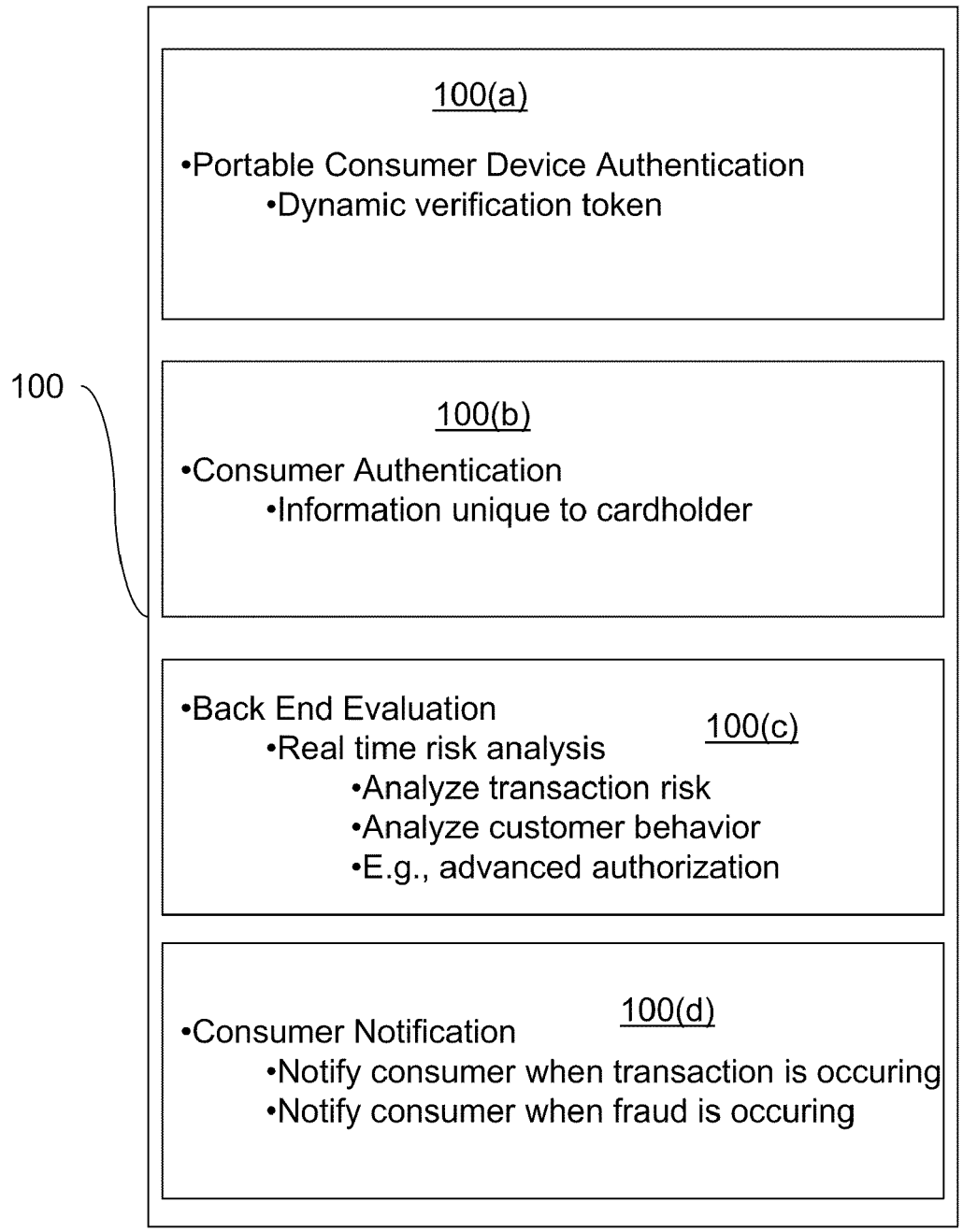
FIG. 2 shows a conceptual block diagram illustrating the various aspects of authenticating a purchase transaction.

FIG. 2 shows a conceptual block diagram 100 illustrating the various aspects of authenticating a purchase transaction. Such aspects include portable consumer device authentication 100(a), consumer authentication 100(b), back end processing including real time risk analysis 100(c), and consumer notification of the purchase transaction 100(d).

The present invention generally relates to portable consumer device authentication, which authenticates the portable consumer device used in the purchase transaction. That is, in a portable consumer device authentication process, a determination is made as to whether the portable consumer device that is being used in the purchase transaction is the authentic portable consumer device or a counterfeit portable consumer device. Specific exemplary techniques for improving the authentication of a portable consumer device include the use of dynamic card verification values (dCVVs), as will be discussed in further detail below.

As shown in FIG. 2, other authentication aspects include consumer authentication 100(b), which relates to a determination as to whether or not the person conducting the transaction is in fact the owner or authorized user of the portable consumer device. Conventional consumer authentication processes are conducted by the merchants. For example, merchants may ask to see a credit card holder's driver's license before conducting a business transaction with the credit card holder. Back end processing 100(c) relates to processing that may occur at the issuer or payment processing system, or other non-merchant location. Various processes may be performed at the "back end" of the payment transaction to help ensure that any transactions being conducted are authentic. Back end processing 100(c) may also prevent transactions that should not be authorized, and can allow transactions that should be authorized. Lastly, consumer notification 100(d) is another aspect of transaction authentication. In some cases, a consumer may be notified that a purchase transaction is occurring or has occurred. If the consumer is notified (e.g., via cell phone) that a transaction is occurring using his portable consumer device, and the consumer is in fact not conducting the transaction, then appropriate steps may be taken to prevent the transaction from occurring.

Specific details regarding some of the above-described aspects are provided below. The specific details of the specific aspects may be combined in any suitable manner without departing from the spirit and scope of the invention. For example, portable consumer device authentication 100(a) may be combined with consumer authentication 100(b), back end processing 100(c), and consumer transaction notification 100(d) in some embodiments of the invention.

As previously mentioned, one method of authenticating a portable consumer device relates to the use of dynamic authentication data. To help ensure that the portable consumer device being used in a payment transaction is in fact the authentic portable consumer device, "dynamic" data is provided from the portable consumer device. Dynamic data is data that may change over time, and is therefore more secure than static data (e.g., a name or number). For example, a portable consumer device authentication process may include "dynamic" authentication data such as a dCVV (or dynamic card verification value). In comparison, "static" data may be data that does not change over time. For example, today, credit cards have card verification values (CVVs) printed on the back of the cards that can be used to verify that the portable consumer device being used is authentic.

Dynamic CVVs (or dCVVs) are described in Sahota et al. U.S. Patent Application Publication No. 2005/0043997 ("Sahota"), which is incorporated by reference herein in its entirety for all purposes. Sahota describes the generation of a dynamic verification value using an automatic transaction counter (ATC) maintained on the device in conjunction with payment data from the device such as a PAN (primary account number), an expiration date, and a service code. The ATC will initially be set by the service provider to a predetermined value. Thereafter, the ATC may be incremented or decremented with each transaction. The service provider which deployed the payment service will maintain a corresponding ATC accessible to the service provider's computer. This corresponding ATC is used to identify payment services which may have been skimmed.

Each time the payment service is initiated, a dCVV is generated on the portable consumer device for authentication purposes. A dCVV may be generated using encryption keys that may be uniquely derived. The encryption keys may have any suitable characteristics. In one approach, the encryption keys take the value of unique keys derived from data existing on the portable consumer device, such as the payment data (e.g., PAN, expiration date, service code).

In one approach, the ATC and the dCVV are transmitted from a merchant to an issuer where they are evaluated for possible approval. The ATC is maintained on the portable consumer device and keeps track of the number of times that a portable consumer device is used. If there is a mismatch between the ATC value that is received at the issuer and the expected ATC value from the issuer's separate counter, then the transaction may be denied as possibly fraudulent. If the received ATC matches the expected ATC value, then the issuer may independently generate a dCVV using encryption keys and the received payment data to authenticate the portable consumer device. If the transaction is authenticated, then the issuer's counter accepts the received ATC value, which is also maintained on the portable consumer device.

The dCVV or other dynamic data may be transmitted using any suitable secure data transmission process and may use DES (dynamic encryption standard), as well as ECC (elliptical curve cryptography), or AEC (advanced encryption cryptography). Any symmetric or asymmetric cryptographic elements may be used.

In view of the foregoing, it is advantageous to provide a portable consumer devices capable of reading, updating, generating, storing, and transmitting dynamic authentication data, such as an ATC or dCVV. It is particularly advantageous to provide such a portable consumer device that is powered exclusively from external power sources. In some embodiments of the present invention, portable consumer devices are provided that include a processor for generating the dynamic authentication data (e.g., ATC or dCVV), a memory for storing the data, a read-write device for reading the memory and writing onto the memory, and an interface for transmitting the data from the device to an external device and for receiving external power. The portable consumer devices are powered by an external power source instead of a power source internal to the device, such as a battery. In some embodiments, the devices may be powered using energy received from an external power source and stored at a temporary storage means on the device. Examples of external power sources include access devices such as POS terminals, ATM machines, transaction calculators, etc. In embodiments of the invention, each time a portable consumer device is powered by an external power source, a new authentication value (e.g., ATC value) may be produced by the device, transmitted from the device, and stored on the device. In other embodiments, a new dCVV value may be produced using the new ATC value each time a portable consumer device is powered by an external power source.

Figure 3A:
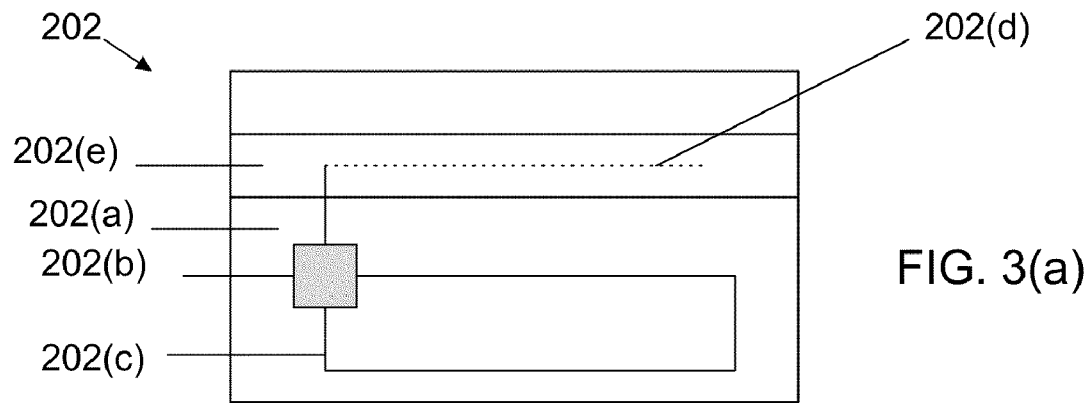
FIGS. 3(a)-(e) show various embodiments of the portable consumer device in accordance with the present invention.

FIGS. 3(a)-3(d) illustrate a number of payment card embodiments of a portable consumer device in accordance with the invention. As stated previously, it should be understood that any number of alternate forms for the portable consumer device may be used to implement the concepts of the present invention. FIG. 3(a) shows a magnetic stripe card 202 including a plastic body 202(a). A magnetic stripe 202(e) is on the plastic body 202(a) and serves as the device memory. The memory stores the dynamic authentication data (e.g., the most recent ATC value). The memory may also store instructions for an algorithm that generates or updates the dynamic authentication data (e.g., instructions for updating the ATC or generating the dCVV). The memory also preferably stores information such as financial information, transit information (e.g., as in a subway or train pass), access information (e.g., as in access badges), etc. Financial information may include information such as bank account information, bank identification number (BIN), credit or debit card account number information (PAN), account balance information, expiration date, consumer information such as name, date of birth, etc. Any of this information may be transmitted by the portable consumer device.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The plastic body 202(a) may include an embossed region, which may have information such as cardholder name, card number, and expiration date (not shown). A processor (e.g., a microprocessor) 202(b) is located on the plastic body 202(a) for carrying out the processing tasks of the device. For example, processor 202(b) may update the ATC or generate the dCVV using predefined algorithms stored on the device memory. A read-write device 202(d) and an antenna 202(c) are coupled to the processor 202(b). Although this exemplary embodiment shows a read-write device 202(d) for a magnetic stripe 202(e), in other embodiments, the read-write device may be embodied by logic which may read and/or write data to a volatile or semi-volatile solid-state memory device such as a flash memory chip or the like. Read-write device 202(d) may be used to read the dynamic authentication data value before a transaction and to rewrite the new data value after the transaction. Antenna 202(c) may be a coil of wire which communicates with and receives power from a contactless card reader (not shown). As is well known in the art, when the coil of wire in a passive contactless antenna is moved through an electromagnetic field produced by a contactless card reader, a current is generated in the wire coil that powers the components of the portable consumer device. Power received through antenna 202(c) can be the only source of power for operating the processor 202(b) and read-write device 202(d) to carry out the processes of the portable consumer device.

Antenna 202(c) may be capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 202 and an interrogation device, such as a contactless reader.

During use, the antenna 202(c) may allow the magnetic stripe card 202 to communicate with an external contactless reader (not shown) so that information stored in the device memory (i.e., stripe 202(e)) is transmitted to the reader via the processor 202(b) and the read-write device 202(d). The transmitted information may include payment information such as a PAN, expiration date, etc., and dynamic authentication data, such as an ATC value. At the same time, the antenna 202(c) may also receive power from the electromagnetic field of the contactless reader to power processor 202(b) and read-write device 202(d) temporarily so that the read-write device 202 (d) can also rewrite the dynamic authentication data (e.g., ATC value or dCVV) on the magnetic stripe 202(e) after the transaction is complete.

In one exemplary approach, the ATC value and optionally the dCVV may be stored on stripe 202(e). Each time the device 202 is powered by an external power source, for example by a contact reader via antenna 202(c), the processor 202(b) and read-write device 202(d) may be powered to read at least the ATC value from the stripe 202(e). Processor 202 (b) may then use an algorithm stored on stripe 202(e) to generate the next, expected ATC value. Based on the next ATC value and other information stored on the stripe 202(e), such as the PAN, expiration date, and service code, the processor 202(b) may also generate the next dCVV value using a predetermined algorithm stored on the stripe 202(e). The next ATC and dCVV values may be transmitted externally of the device 202, for example, via antenna 202(c) to the contactless reader. The transmitted dynamic authentication values may then be transmitted to the issuer to authenticate the portable consumer device 202 as is described above. If the transaction is approved, then the next ATC and dCVV values may be written onto stripe 202(e) by processor 202(b) and read-write device 202(d) using power received from an external source (e.g., the contactless reader).

Thus, as illustrated by the above example, embodiments of the invention can include the use of an externally powered portable consumer device capable of storing, reading, updating, generating, and rewriting dynamic authentication data used in a portable consumer device authentication transaction. As used herein, an "externally powered device" is one that does not carry its own source of power and relies on the receipt of external power for operating its components. That is, the energy used to operate the components of an externally powered device originates from an external source. In many instances, this approach enables the elimination of a battery in a portable consumer device and provides so called "batteryless" devices. It should be understood, however, that an externally powered device may include one or more energy storage means that store energy received from an external source via the device's power interface (e.g., electrical contacts or wireless induction interface). In some instances, this energy storage may be temporary and the stored energy is used up at the end of each authentication transaction.

Moreover, the present invention provides an approach whereby the dynamic authentication data stored on the portable consumer device only changes when the device is powered by an external power source, such as a POS terminal or ATM machine. The corresponding dynamic authentication data stored at the issuer may also be changed only when the portable consumer device changes its authentication data. As such, it will be ensured that the dynamic authentication data stored on the portable consumer device and at the issuer will correspond with each other despite intervening transactions where the portable consumer device is not externally powered to update the dynamic authentication data (e.g., when the consumer uses the card over the phone or the Internet).

Figure 3B:
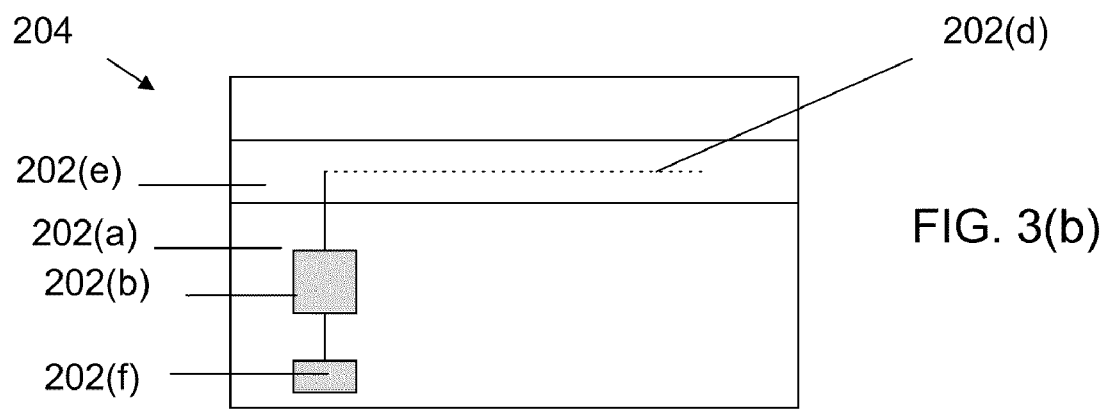

Another payment card embodiment 204 of the invention is shown in FIG. 3(b). In FIGS. 3(a) and 3(b), like numerals designate like elements. However, in FIG. 3(b), a conductive contact region 202(f) is shown and the conductive contact is coupled to the processor 202(b) instead of an antenna. In this example, the contact region 202(f) may include multiple electrical contacts so that it may interface with and electrically contact a corresponding contact region in a card reader such as a POS terminal or ATM machine (not shown). When the card 204 is used, power can be supplied to the processor 202(b) and the read-write device 202(d) via the conductive contact 202(f), and the device 204 can function as described above to read, update/generate, transmit, and store dynamic authentication data.

Figure 3C:
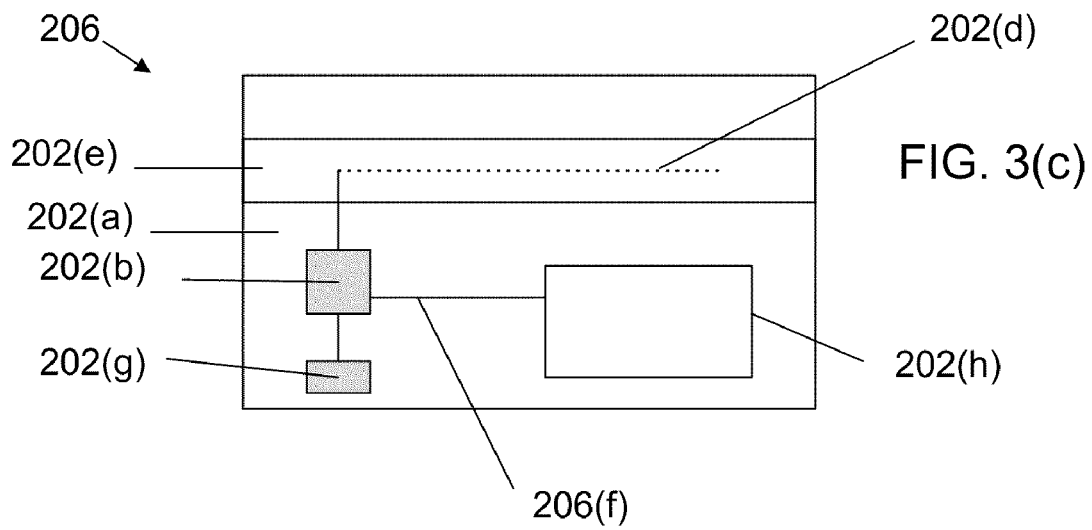

FIG. 3(c) shows another magnetic stripe card 206 according to an embodiment of the invention. It includes a portable consumer device reader interface region such as a interface region 202(g), which may take the form of the above-described antenna 202(c) or electrically conductive contact 202 (f) or another suitable interface. Power can be supplied to the processor 202(b) and the read-write device 202(d) via the interface region 202(g) as described above. In the embodiment of FIG. 3(c), a semi-static display 202(h) is coupled to the processor 202(b). Each time the processor 202(b) is powered by an external source (e.g., card reader) during a purchase transaction, the processor 202(b) can cause the display 202(h) to display a dynamic authentication value such as the dCVV value. The dCVV value may be viewed by a consumer and used in a mail order, telephone, or Internet purchase transaction to help verify that the consumer has an authentic card. In this example, the same or different dCVV value (or other dynamic authentication data) may be electronically transmitted to the card reader and subsequently transmitted in an authorization request message to the issuer for further verification.

Figure 3D:
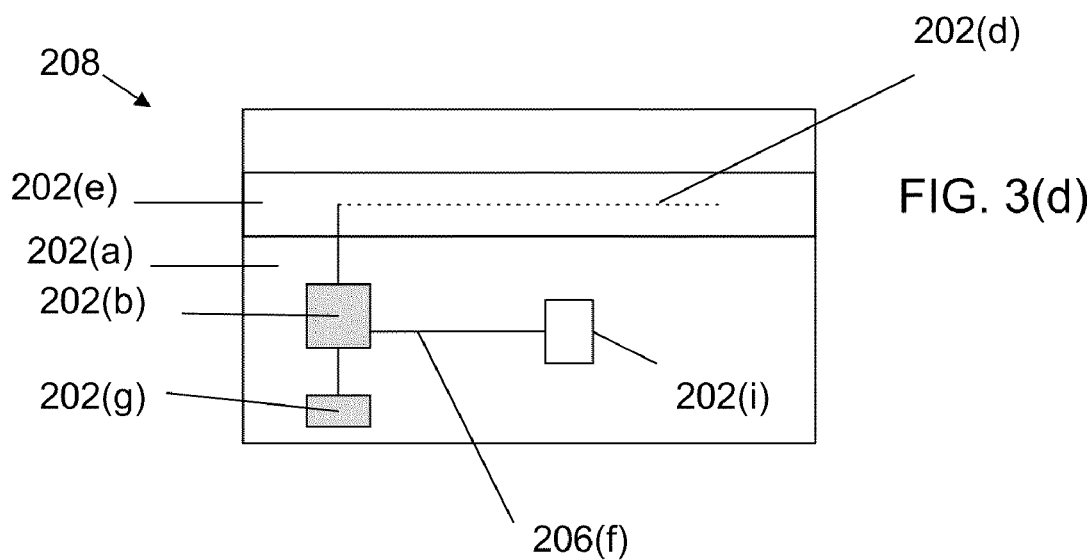

FIG. 3(d) shows another embodiment of the invention in which the portable consumer device includes an energy storage means for storing power received from the external source. Card 208 includes a portable consumer device reader interface region such as a interlace region 202(g) which, as described above, may take the form of antenna 202(c), electrically conductive contact 202(f), or any other suitable data and power interface. Power can be supplied to the processor 202(b) and the read-write device 202(d) via the interface region 202(g) as described above. In the embodiment of FIG. 3(d), an energy storage means 202(i) is coupled to the processor 202(b). Energy storage means 202(i) may be an electrical capacitor or other suitable device. Each time the processor 202(b) is powered by an external source (e.g., by a contactless reader) during a purchase transaction, a portion of the power received the processor 202(b) can be stored in energy storage means 202(i) for later use by the portable consumer device.

For example, in an instance where card 208 is a contactless device that receives an amount of energy from the contactless reader when it is passed through the magnetic field of the reader, a portion of the received energy may be used to immediately power the processor 202(b) and read-write device 202(d) to read data stored on the magnetic stripe 202(e), generate updated dynamic authentication data, and transmit data to an external device. A portion of the received energy may be stored in device 202(i) until the transaction is approved by the issuer, at which time the stored energy is used to power the processor 202(b) and read-write device 202(d) to rewrite the updated dynamic authentication data on the magnetic stripe 202(e). The energy storage on device 202(i) may only be temporary and the stored energy may be discharged to power the portable consumer device only during each transaction.

Figure 3E:
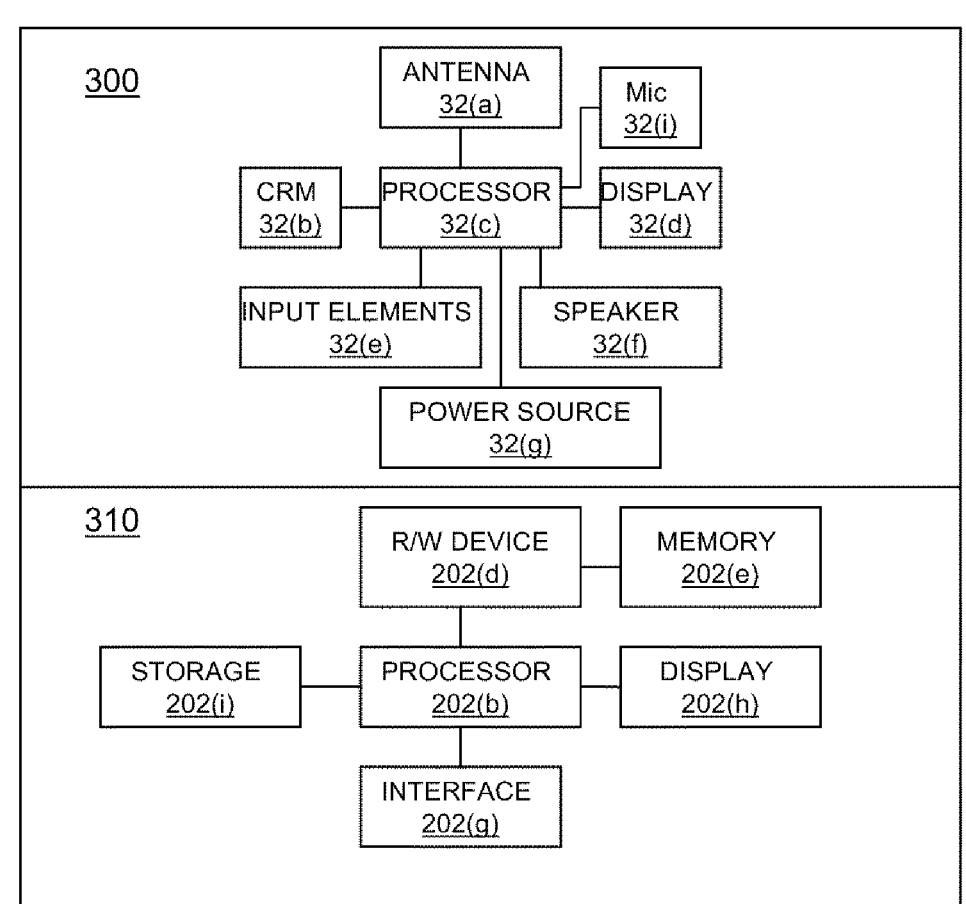

FIG. 3(e) shows another embodiment illustrating how the invention can be applied in a mobile wireless device, such as a cellular phone or wireless enabled PDA. Portable consumer device 32 may include a body 32(h) that includes a wireless mobile device portion 300 and a payment authentication portion 310. Device portion 300 may comprise a computer readable medium 32(b) which may be present within the body 32(h), or may be detachable from it. The body 32(h) may be in the form a plastic substrate, housing, or other structure. The computer readable medium 32(b) may be memory that stores data and may be in any suitable form including a memory chip, etc.

The device portion 300 may also include a processor 32(c) (e.g., a microprocessor) for processing the functions of the portable consumer device 32 and a display 32(d) to allow a consumer to see phone numbers and other information and messages. The device portion 300 may further include input elements 32(e) to allow a consumer to input information into the device, a speaker 32(f) to allow the consumer to hear voice communication, music, etc., and a microphone 32(i) to allow the consumer to transmit her voice through the portable consumer device 32. The device portion 300 may also include an antenna 32(a) for wireless data transfer (e.g., via cellular networks). The device portion 300 may also include one or more power sources or power supplies 32(g), such as a rechargeable battery.

Payment authentication portion 310 includes the components previously described with respect to the specific payment card embodiments of FIGS. 3(a)-(d). In particular, an interface 202(g) is provided which may be a contactless antenna 202(c), an electrical contact 202(f), or any other suitable interface for power and data exchange. Interface 202(g) is coupled to processor 202(b) which is coupled to read-write device 202(d). Memory 202(e) is also provided on which the read-write device 202(d) operates. Further, processor 202(b) may optionally be coupled to display 202(h) and/ or energy storage means 202(i).

As previously described, the payment authentication portion 310 may be entirely powered by a power source external to portable consumer device 32. Therefore, processor 202(b) and read-write device 202(d) may not be coupled to power source 32(g) of the device portion 300. In operation, payment authentication portion 310 may be separately powered entirely through interface 202(g), such that portion 310 may be powered and used to complete a transaction even when device portion 300 is powered off. It is contemplated that in some embodiments components of payment authentication portion 310 may overlap with components of device portion 300. In such embodiments power for the authentication transaction is still entirely provided by an external source, such that no power from power source 32(g) is required to complete the authentication transaction.

Figure 4:
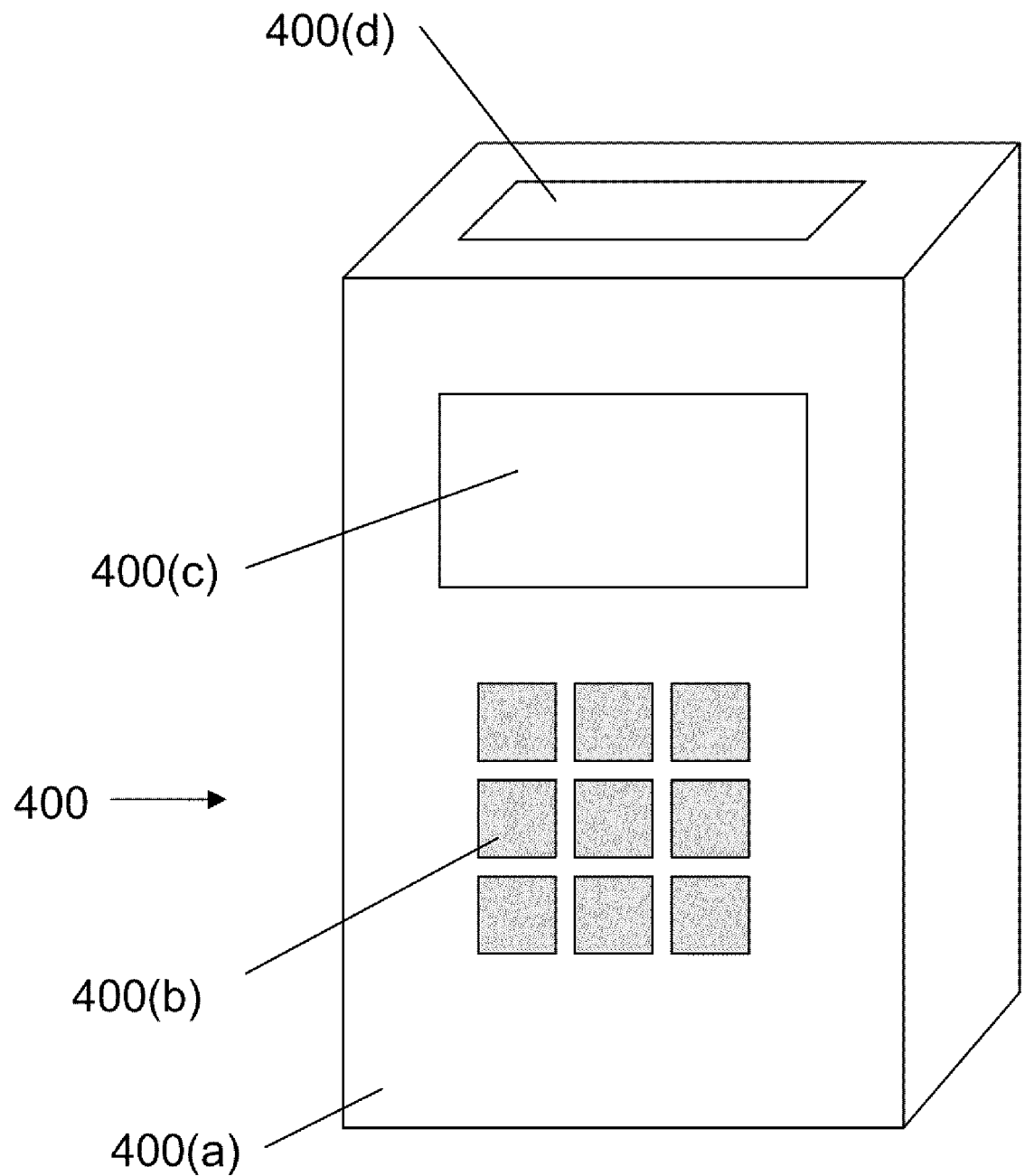
FIG. 4 shows a security device in accordance with the present invention.

FIG. 4 shows a security device 400 which can be used to power cards of the type shown in FIGS. 3(b)-3(d). The security device 400 may have a data input region 400(b) (e.g., keys) on a housing 400(a). The housing 400(a) may define a slot 400(d) which can receive a card like those described above. A display 400(c) is also present on the housing 400(a). The security device 400 may contain a microprocessor, batteries, and a memory comprising computer code for producing a one-time transaction code or number (e.g., dCVV) for a consumer purchase transaction. The logic for producing the one-time transaction code may also reside on another server or computer (e.g., an issuer's server) so that the issuer, merchant, or other party, can verify that the person holding the card is in fact the authorized cardholder. In this example, the security device 400 may be characterized as a hard security token and may be used to help authenticate the consumer.

During use, a consumer may insert a magnetic stripe card (as described above) into the slot 400(d). A one time transaction code (e.g., dCVV) may then be displayed on the screen 400(c). When the card is inserted into the security device 400, power from the power source in the security device 400 powers the processor and read-write device in the card so that dynamic authentication data (e.g., ATC value) on the card can be read, transmitted to the security device 400, and subsequently changed on the card memory. Thus, the security device 400 can be used to produce a one time transaction number for a transaction (e.g., dCVV), and also temporarily supply power to an externally powered card so that a counter value (e.g., ATC value) can change in the card. In some embodiments, the one time transaction number or dCVV may be generated using the process on the portable consumer device and transmitted to the security device 400 for display. A system using both the security device 400 and an externally powered card utilizing dynamic authentication data can advantageously authenticate both the consumer as well as the portable consumer device.

Figure 5:
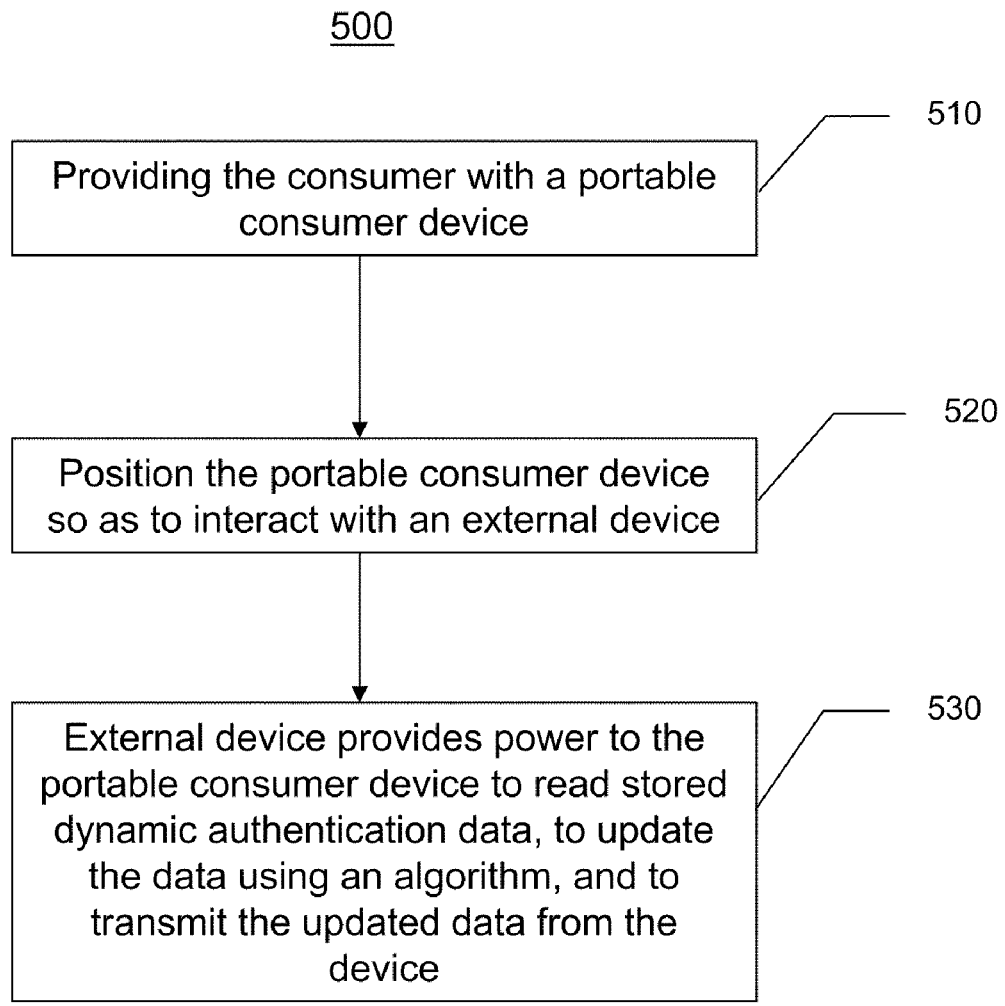
FIG. 5 is a flow diagram illustrating a method in accordance with the present invention.

FIG. 5 is a flow chart illustrating a method of authenticating a payment transaction in accordance with an embodiment of the present invention. At step 510, the method is entered into by providing the consumer with a portable consumer device. At step 520, the consumer positions the portable consumer device so as to interact with an external device. For example, the external device may be a contactless card reader, a security device like device 400 of FIG. 4 having card slot 400(*d*), a POS terminal, an ATM machine, and the like, and the user may place the portable consumer device within or adjacent the external device to initiate the interaction. At step 530, the external device provides power to the portable consumer device to read its stored dynamic authentication data, to update the data using an algorithm, and to transmit the updated data from the device. For example, an antenna of a contactless portable consumer device may receive power from an interrogation device to read an ATC value stored on the device memory, update the ATC value using an algorithm to calculate the next ATC value, and transmit the next ATC value to an external device such as security device 400.

In one example, the updated dCVV may be generated using a stored algorithm at the processor of the portable consumer device, such as processor 202(*b*) of card 202, based on the next ATC value generated at the processor and other stored information such as PAN, expiration date, and service code. The updated dCVV and the next ATC value may then be transmitted from the portable consumer device to an external device, such as security device 400, a POS terminal, or an ATM machine, or further upstream to an issuer's server for authentication purposes. Each time the processor 202(*b*) is powered up by an external power source, the ATC value or other piece of dynamic data can change. In another example, the next ATC value may be calculated by the portable consumer device and transmitted along with other data to an external device. Generation of the dCVV may then occur at the external device.

It is apparent to one skilled in the art that various changes and modifications can be made to this disclosure, and equivalents employed, without departing from the spirit and scope of the invention. Elements shown with any embodiment are exemplary for the specific embodiment and can be used on other embodiments within this disclosure.

What is claimed is:

1. A portable consumer device comprising:
a batteryless portable body of a consumer device;
memory housed by the portable body, the memory storing dynamic authentication data;
a read-write device housed by the portable body and coupled to the memory, the read-write device being configured to change the dynamic authentication data each time the portable consumer device is temporarily powered by an external device, wherein the read-write device is configured to read the dynamic authentication data from the memory before a transaction, and write updated dynamic authentication data to the memory after the transaction; and
an antenna coupled to the portable body and coupled to the read-write device,
wherein the read-write device is configured to function only when receiving power from the external device that is not of the consumer.

2. The portable consumer device of claim 1, wherein each and every time the antenna is within range of an active energy field of the external device, the dynamic authentication data is communicated to the external device via the antenna.

3. The portable consumer device of claim 2, wherein external device comprises a contactless point-of-sale device which requires no physical contact with the portable body in order to communicate to the antenna.

4. The portable consumer device of claim 2, wherein the contactless point-of-sale device generates the active energy field in order to conduct a transaction with the consumer.

5. The portable consumer device of claim 1, wherein the antenna comprises a coil which generates a charge to power the read-write device each and every time the charge is generated via an electromagnetic field generated by the external device.

6. The portable consumer device of claim 1, wherein the portable body comprises a payment card.

7. The portable consumer device of claim 6, wherein the external device is one of an ATM device and point-of-sale device.

8. The portable consumer device of claim 1, wherein electrical energy used to temporarily power the read-write device is only sourced from the external device.

9. The portable consumer device of claim 8, wherein the electrical energy is temporarily stored in an energy storage device within the portable body, and wherein the temporarily stored electrical energy is completely discharged from the energy storage device by the end of a transaction with the external device.

10. The portable consumer device of claim 9, wherein each time the electrical energy is used to temporarily power the read-write device, the read-write device is further configured to generate a verification value based on the updated authentication data.

11. The portable consumer device of claim 1, further comprising:
a processor housed by the portable consumer device, configured to generate the dynamic verification value using an algorithm stored in the memory.

12. The portable consumer device of claim 1, wherein the portable consumer device is configured to receive power from the external device when the portable consumer device is positioned within or adjacent to the external device.

* * * * *